(12) United States Patent
Vinogradov et al.

(10) Patent No.: US 7,352,519 B2
(45) Date of Patent: Apr. 1, 2008

(54) LENS MODULE

(75) Inventors: Igor Vinogradov, Bay Shore, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 176 days.

(21) Appl. No.: 11/196,585

(22) Filed: Aug. 3, 2005

(65) Prior Publication Data

US 2007/0030578 A1 Feb. 8, 2007

(51) Int. Cl.
*G02B 9/08* (2006.01)
(52) U.S. Cl. ........................ 359/738; 359/739
(58) Field of Classification Search ........ 359/708–719, 359/738–740
See application file for complete search history.

(56) References Cited

U.S. PATENT DOCUMENTS

| 4,643,545 | A | | 2/1987 | Vanderwall |
| 4,792,685 | A | | 12/1988 | Yamakawa |
| 5,173,810 | A | | 12/1992 | Yamakawa |
| 5,526,190 | A | | 6/1996 | Hubble, III et al. |
| 5,565,668 | A | * | 10/1996 | Reddersen et al. .... 235/462.22 |
| 5,917,661 | A | * | 6/1999 | Tochigi et al. ............... 359/717 |
| 6,356,398 | B1 | | 3/2002 | Otsuki et al. |
| 6,560,040 | B2 | * | 5/2003 | Kaneko et al. ............. 359/739 |
| 2002/0030898 | A1 | * | 3/2002 | Kouchiyama et al. ...... 359/738 |
| 2002/0085390 | A1 | | 7/2002 | Kiyomoto et al. |
| 2003/0052174 | A1 | * | 3/2003 | Shibuya et al. ........ 235/462.43 |
| 2004/0246600 | A1 | * | 12/2004 | Feng ......................... 359/831 |

FOREIGN PATENT DOCUMENTS

GB 2 419683 5/2006

* cited by examiner

*Primary Examiner*—Scott J. Sugarman
*Assistant Examiner*—DaWayne A Pinkney
(74) *Attorney, Agent, or Firm*—Fay Kaplun & Marcin, LLP

(57) ABSTRACT

Combining one or more elements of a beam shaping assembly in a lens module to, for example, reduce the mechanical tolerances in construction of the assembly. An exemplary lens module comprises a molded plastic lens with alignment features, a cylindrical surface, a focusing surface, and an aperture. The aperture is formed by surface positioned on the lens module at an angle greater than the angle for total internal reflection.

33 Claims, 5 Drawing Sheets

LENS MODULE

FIELD OF THE INVENTION

The invention is directed to optical components, more particularly to a lens module comprising integrated components, for example, for a data capture device.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, manage a wide variety of objects under a similar system and the like. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to products. They can be used to identify important objects, places, etc. Dataforms can also be other objects such as a trademarked image, a person's face, etc.

Devices, such as, for example, a laser based barcode scanner, can be used to decode dataforms and automatically obtain information about a product from them. Known laser scanners comprise beam shaping optics to form their laser beams. To improve scanner performance, for example, with low contrast and poorly printed barcodes, an elliptically shaped laser spot is preferable. An elliptically shaped laser spot can be formed by elongating the vertical height of the laser spot, for example by adding an optical component with astigmatism to the beam shaping optics. An optical component with astigmatism can be, for example, a cylindrically shaped lens or mirror. An accurate orientation of the cylindrical component in the scanner is critical for consistent scanner performance. For example, if the lens is off by 90 degrees, the laser spot is elongated in a horizontal direction and does not provide performance enhancements.

FIG. 2 illustrates an exemplary beam shaping assembly 200 comprising a laser 205, a focusing lens 215, a cylindrical lens 220, a lens holder 210 and an aperture 225. Laser light is focused by the focusing lens 215, elongated by the cylindrical lens 220 and further shaped by the aperture 225. The aperture 225 can have a non-rotationally symmetrical shape, such as, for example, a rectangle, an ellipse, etc. An exemplary method of creating an aperture is to die cast a hole in an opaque material, such as, the lens holder. In general it can be difficult to control the quality of the size and edges of the aperture in a mass production environment. This leads to aperture defects such as, for example, flash at the edge of the aperture and out-of-spec sizes.

Although not shown, the lens holder 210 comprises alignment features that help properly orient the lens module in a scanner. When the assembly 200 is constructed, it is very important to properly orient the cylindrical lens 220 with the aperture 225 and/or the alignment features of the lens holder, or else the laser beam will be improperly shaped when the lens module is placed in the scanner.

Accordingly, there is a desire to simplify the construction of the beam shaping assembly of scanners. In addition, there is a desire to improve the quality of mass produced apertures.

SUMMARY OF THE INVENTION

The invention as described and claimed herein satisfies this and other needs, which will be apparent from the teachings herein.

A lens module implemented in accordance with the invention comprises a focusing lens and an aperture that is part of the focusing lens. The aperture is formed by at least one surface positioned on the lens at an angle larger than a critical angle for total internal reflection. The shape of the aperture can be formed by positioning critically angled surfaces on the focusing lens. The area on the surface of the focusing lens covered by the angled surfaces reflects light away, while the area on the surface of the focusing lens not covered by the angled surfaces forms an aperture that allows light to pass through.

The aperture can have a semi-elliptical shape, an elliptical shape, a rectangular shape, a circular shape, a free shape, etc, and the aperture can define a horizontal width or a vertical height of a laser beam.

The focusing lens comprises a surface where light enters the focusing lens and a surface where light exits the focusing lens. Either surface can be formed to focus the light entering the lens. In some embodiments the opposite surface can have a non-rotationally-symmetrical shape, such as, for example, a cylindrically shaped surface, to elongate the vertical height of the beam spot and increase scanner performance. The angled surfaces that form the aperture are formed on the exiting surface of the lens.

In the embodiments of the invention comprising a non-rotationally-symmetrical surface, the orientation/alignment of the surface with respect to the scanning device is important because improper installation of the lens could result in improper elongation of the beam spot, and decreased scanner performance. Thus, some embodiments of the invention comprise alignment features on the lens module. The alignment features can be a protruding members, recessed portions, etc.

In some embodiments of the invention, the lens module further comprises a cylindrical lens holder. The single piece focusing lens/cylindrical surface/aperture can be inserted into the cylindrical lens holder, without having to worry about orientation.

In alternate embodiments of the invention the lens holder can have its own rotationally-symmetrical aperture. Thus, the lens aperture defines either a width of a laser beam or a height of a laser beam and the lens holder aperture defines the other dimension of the laser beam. Some lens holder apertures may be non-rotationally-symmetrical, but the orientation of the lens and aperture in those lens holders would be important.

An alternate lens module implemented in accordance with an embodiment of the invention comprises a focusing lens, an aperture, and a lens holder. The aperture, which is part of the focusing lens, is formed by at least one surface on the focusing lens positioned at an angle larger than a critical angle for total internal reflection.

Another lens module implemented in accordance with an embodiment of the invention comprises a focusing lens and an alignment feature. The focusing lens comprises a first surface for receiving light, and a second surface for focusing light exiting the focusing lens. The first surface a rotationally-symmetrical shape, such as, for example, a spherical shape, or a non-rotationally-symmetrical shape, such as, for example, a cylindrical shape. This exemplary lens can also comprise an aperture and/or a lens holder.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

Figure 1:
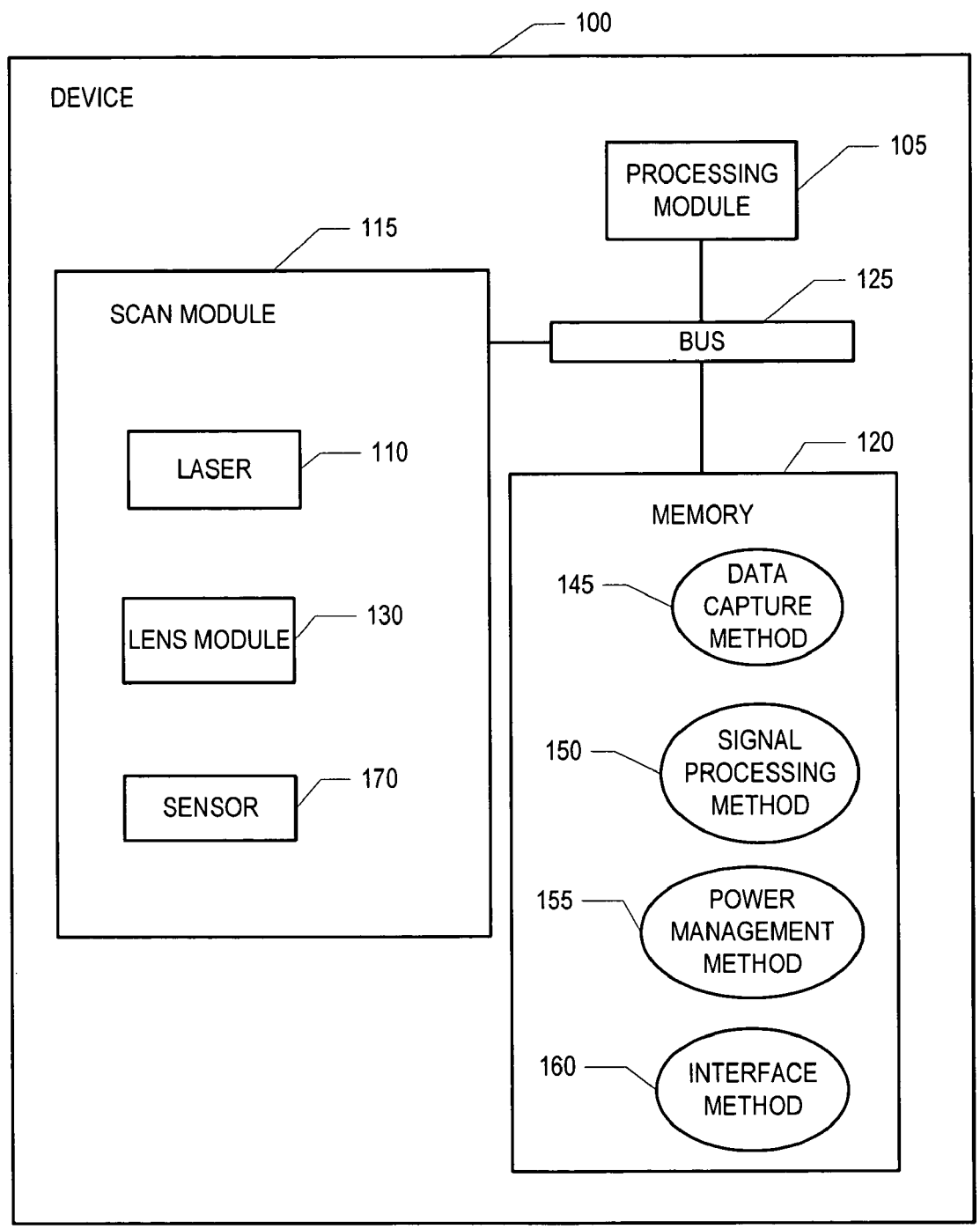
FIG. 1 illustrates and exemplary device implemented according to an embodiment of the invention.
Figure 2:
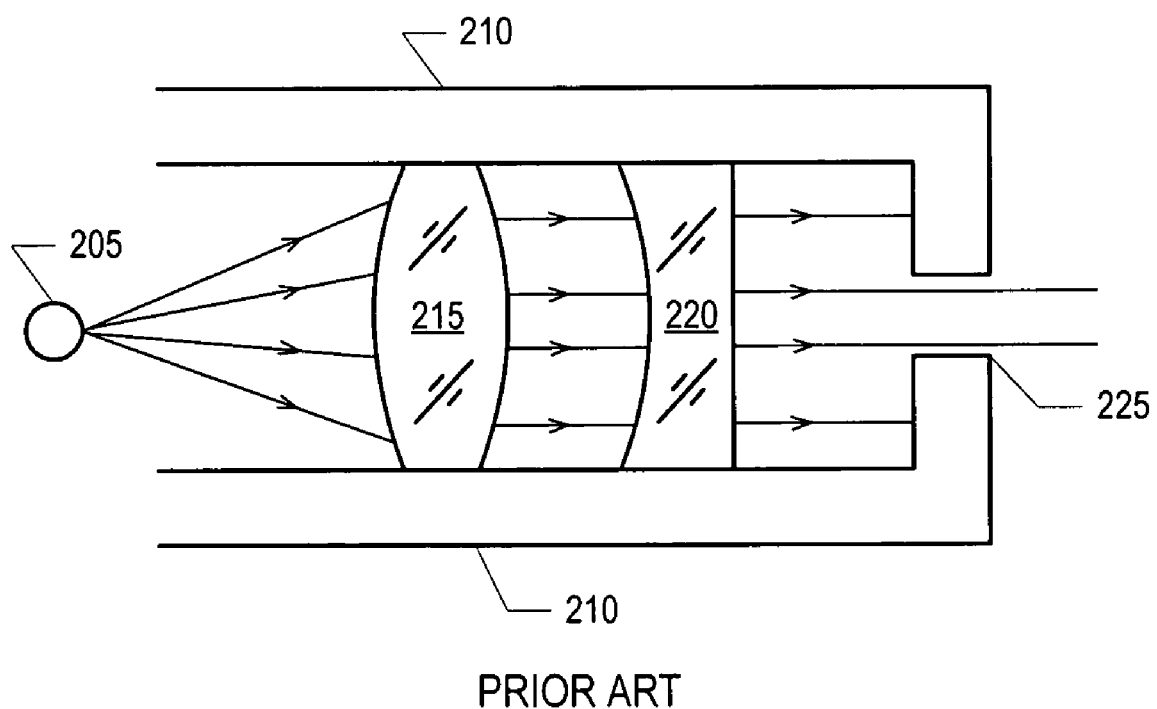
FIG. 2 illustrates a known optical assembly.

There will now be shown and described in connection with the attached drawing figures several exemplary embodiments of a lens module.

A vertically elongated shaped laser spot, such as, for example, an ellipse, is preferable when scanning a dataform in a direction perpendicular from the elongation. Thus, for at least this reason scanning devices comprise beam shaping assemblies that form the laser beam into a desirable shape. For example, a cylindrically shaped optical component and an aperture can be used to properly shape the laser beam. But, since a cylindrically shaped lens and many apertures are non-rotationally symmetrical, the orientation of the lens and the aperture with respect to the scanning device is important to ensure that the laser spot is elongated vertically.

Many scanning devices use a lens holder with an aperture and alignment features to ensure that the beam shaping assembly is correctly inserted onto the scanning device. This added additional steps to the construction of the beam shaping assembly because the lenses have to be properly inserted into the lens holder, and the aperture has to be reproduced accurately and consistently, thereby creating a chain of mechanical tolerances. Any deviation in the proper alignment/orientation of the cylindrical lens and the alignment features, leads to improper beam shaping with respect to the orientation of the scanning device, and thus decreased scanning performance. In addition, defects in an aperture can also cause improper beam shaping and degrade scanner performance.

An exemplary lens module implemented in accordance with the invention reduces the number of mechanical tolerances by combining a focusing lens with an aperture in a combined lens component. The aperture is formed by surfaces, which are part of the focusing lens, that are positioned on the lens at an angle greater than a critical angle for total internal reflection. Areas of the focusing lens covered by the critically angled surfaces reflect light, and areas not covered by the angled surfaces form the aperture that allows light to pass. In an embodiment, the lens can be molded and made of plastic, and the aperture can be easily and accurately reproduced.

In some embodiments of the invention, the aperture defines both the height and width of the laser beam. In other embodiments a machined, molded or otherwise formed lens holder with an aperture can also be used to shape one or more of the laser beam's dimensions. Still in other embodiments, the shape of the laser source in combination with either or both a lens aperture and a lens holder aperture can be used to shape a laser beam.

Mechanical tolerance can be further reduced, in some embodiments, by including a non-rotationally-symmetrical optical surface, such as, for example a, cylindrical mirror or lens, on the lens module. In other embodiments, an exemplary lens module can also comprise alignment features that help to properly orient the lens module in a scan module. Since the alignment features and the aperture are both located directly on the lens module, in embodiments where a lens holder is used, only a simple cylindrically shaped lens holder is needed. The lens does not have to be oriented with respect to the lens holder.

FIG. 1 illustrates an exemplary device 100 implemented in accordance with an embodiment of the invention. The device 100 can be, in exemplary embodiments, a handheld scanner, mobile computer, a terminal, etc. The device 100 comprises a processing module 105, scan module 115 and memory 120 coupled together by bus 125. The modules of device 100 can be implemented as any combination of software, hardware, hardware emulating software, and reprogrammable hardware. The bus 125 is an exemplary bus showing the interoperability of the different modules of the device 100. In various embodiments, there may be more than one bus, and in some embodiments certain modules may be directly coupled instead of coupled to a bus 125. Additionally, some modules may be combined with others.

Processing module 105 can be implemented as, in exemplary embodiments, one or more Central Processing modules (CPU), Field-Programmable Gate Arrays (FPGA), etc. In an embodiment, the processing module 105 can comprise a general purpose CPU. In other embodiments, modules of the processing module 105 may be preprogrammed or hardwired, in the processing module's 105 memory, to perform specific functions. In alternate embodiments, one or more modules of processing module 105 can be implemented as an FPGA that can be loaded with different processes, for example, from memory 120, and perform a plurality of functions. Processing module 105 can comprise any combination of the processors described above.

Memory 120 can be implemented as volatile memory, non-volatile memory and rewriteable memory, such as, for example, Random Access Memory (RAM), Read Only Memory (ROM) and/or flash memory. Memory 120 is illustrated as a single module in FIG. 1, but in some embodiments, memory 120 can comprise more than one memory module and some memory 120 can be part of other modules of the device 100, such as, for example, processing module 105.

An exemplary device 100, such as, for example, a handheld scanner, can store in memory a data capture method 145, a signal processing method 150, a power management method 155 and an interface method 160.

Power management method 155 manages the power used by a device 100. In some embodiments, the device 100 can switch to a power save mode, when no activity is detected for a given amount of time. The power save mode can completely shut down the device 100 or alternatively, it can slow down device operations, or initiate other power saving techniques.

Device 100 can use scan module 115 and data capture method 145 to obtain information from a target dataform. Scan module 115 comprises a laser 110, a lens module 130 and a sensor 170. Dataforms are scanned by the device 100 using light emitted by the laser 110, which is focused and shaped by the lens module 130. The sensor 170 receives light returning to the device 100, and the device 100 interprets the returning light, for example using signal processing method 150. In a non-retro scan module, the laser is scanned across a dataform using a small scan mirror and returning light is read by a large sensor. In a retro scan module, the same scan mirror creates the scan pattern and reflects returning light to a sensor for reading.

The device 100, may be an handheld scanner coupled to a terminal, or a handheld computer compromising a scan engine. These devices can have a plurality of different communication protocols. In addition, a single device may be coupled to several different types of other devices. Thus, the device can use interface method 160 to translate decoded dataforms into different communication protocols.

The exemplary embodiment of FIG. 1 illustrates data capture method 145, signal processing method 150, power management method 155 and interface method 160 as separate components, but these methods are not limited to this configuration. Each method and database, described herein, in whole or in part can be separate components or can interoperate and share operations. Additionally, although the methods are depicted in the memory 120, in alternate embodiments the methods can be incorporated permanently or dynamically in the memory of other device modules, such as, for example, processing module 105.

Figure 3:
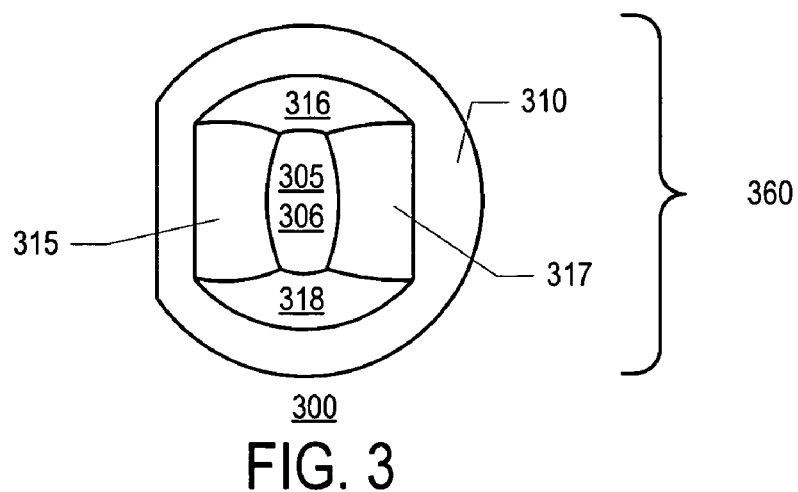
FIGS. 3-5 illustrate several views of a lens module implemented according to an embodiment of the invention.
Figure 4:
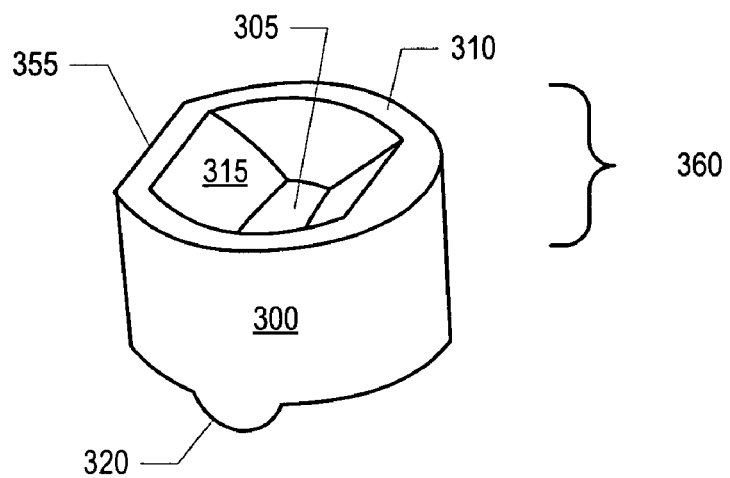
Figure 5:
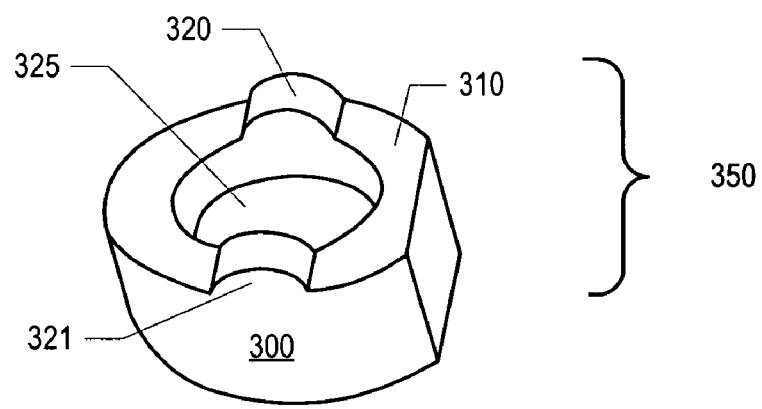

FIGS. 3-5 illustrate an exemplary lens module 300 implemented in accordance with an embodiment of the invention. For example, lens module 300 may be implemented as lens module 130 of device 100. Lens module 300 is a cylindrically shaped lens comprising an outer walled region 310, a first side 350 and a second side 360. Exemplary lens module 300 also comprises a flat side 355 necessitated by a particular molding process. In alternate embodiments of the invention the lens module 300 can be made without a flat side, using another molding process or some other method of forming the lens module 300.

Extending from the outer region 310 on the first side 350 are alignment features 320 and 321. In exemplary lens module 300 the alignment features are semicircles extending from the outer region 310. In alternate embodiments the alignment features can be recessed regions, marks on the lens module 300, the flat side 355, etc. What ever form the alignment features take on the lens module 300, the scan module comprises a complementary alignment feature which ensures the proper insertion of the lens module 300 into the scan module. For example, a scan module receiving lens module 300 would comprise a complementary pair of recessed regions to receive the extending semicircles.

In an alternate embodiment of the invention, a lens module 300 can be formed without an outer region. In this embodiment, the alignment features can be located on a surface of the focusing lens.

When the lens module 300 is placed in a scan module, the first side 350, faces the laser light source, and receives the light. Surface 325 can be made rotationally-symmetrical or non-rotationally-symmetrical. Using a non-rotationally-symmetrical surface such as a cylindrical surface, creates an elliptical beam spot which improves scanner performance.

The laser light exits the lens module 300 from the second side 360. The second side 360 comprises a focusing surface 306 and an aperture 305. The aperture 305 is formed by flat surfaces 315 to 318. Surface 315 to 318 are at an angle greater than a critical angle for total internal reflection in the lens module 300. The critical angle (C) is defined as, $C=\sin^{-1}(n2/n1)$, where, C is the angle from a line normal to the boundary of the first and second media and n1 and n2 are the indices of refraction of the first and second media, respectively. For $n2<n1$, a ray incident at an angle greater than C will undergo total internal reflection (TIR).

Figure 6:
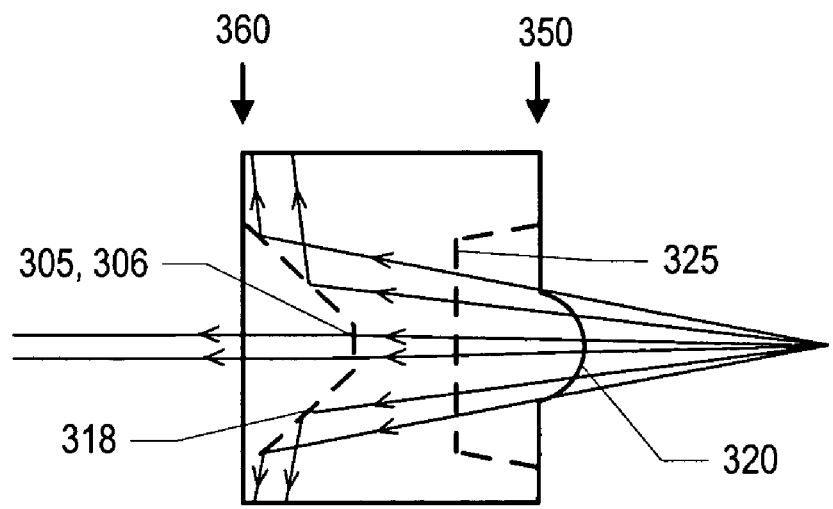
FIGS. 6 and 7 illustrate an exemplary aperture formed using total internal reflection implemented according to an embodiment of the invention.
Figure 7:
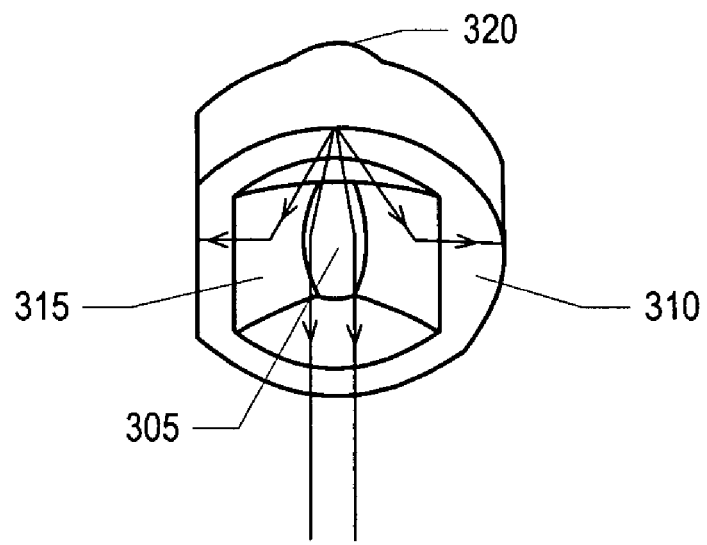

Since the light striking the surfaces 315 to 318 are reflected, the area not covered by a surface forms an aperture 305 that allows light to pass. FIGS. 6 and 7 illustrate the behavior of light entering and exiting the lens module 300. As illustrated, light enters on the first side 350 of the lens module 300. Then, the light striking the angled surfaces 315-318 are reflected while the light passes through the aperture 305 and is focused by the surface 306. In alternate embodiments of the invention, the surface 306 can have a non-rotationally-symmetrical shape and the surface 325, can focus the light entering the lens module 300.

In one embodiment, the lens module 130 may be manufactured from a thermally stable material (e.g., glass). In this manner, properties and/or dimensions of the lens module 130 may not be significantly altered if the device 100 is utilized in environments with different temperatures. For example, the thermally stable material may not change shape as the device 100 moves between hot and cold environments. Thus, light passing through the lens module 130 may not be distorted in the different environments. In another embodiment, the lens module 130 may be manufactured from a thermally unstable material (e.g., plastic). The thermally unstable material may be less expensive than the thermally stable material, but may change properties and/or dimensions in hot and cold environments. Thus, light passing through thermally unstable material may be distorted. When utilizing the thermally unstable material for the lens module 130, a predefined pattern may be applied to the first and/or second sides 350, 360 to reduce a distortion of light passing thermally stable. In one embodiment, the predefined pattern is a diffractive pattern such as, for example, a grid or a set of concentric circulars. In another embodiment, an athermalized lens may be created from the thermally unstable material by applying the predefined pattern to a side(s) thereof.

Figure 8:
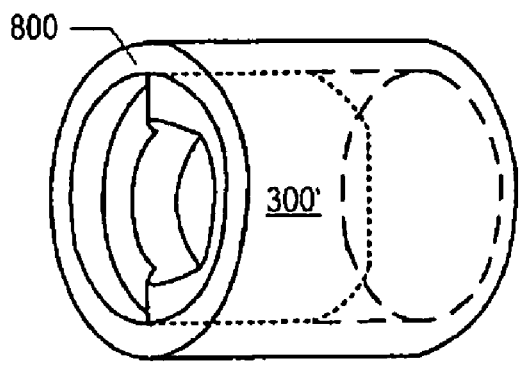
FIG. 8 illustrates an exemplary lens module comprising a cylindrically-shaped lens holder with two open ends implemented according to an embodiment of the invention.

In some embodiments of the invention the lens module 300 can also comprise a lens holder. FIG. 8 illustrates the focusing lens component 300' inserted into a cylindrical lens holder 800. The lens holder does not include alignment features or an aperture. Therefore, the lens holder 800 is simple to manufacture. In addition, the lens component 300' can be inserted in the cylindrical lens holder 800 without having to monitor the orientation between the lens component 300' and the lens holder 800.

The aperture 305 of the lens component 300' can be formed to determine the overall shape of the beam. For example, in different embodiments of the invention, the aperture can have an elongated semi elliptical shape, a rectangular shape, a circular shape, a free form shape, etc. In other embodiments, the aperture 305 defines one dimension of the laser beam, such as, for example, the height or the width, and another component defines the other dimension of the laser beam.

In an embodiment of the invention, a rectangular shaped light source with a larger width than height can be used. Thus, the height of the laser beam is determined by the light source and the width of the laser beam is determined by the aperture.

Figure 9:
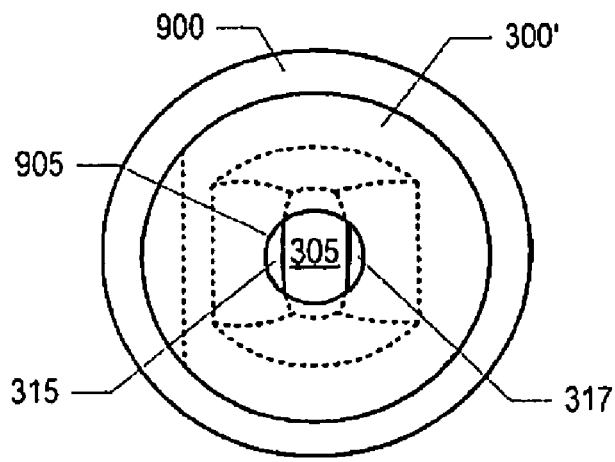
FIGS. 9 and 10 illustrate an exemplary lens module comprising a lens holder with an opaque aperture implemented according to an embodiment of the invention.
Figure 10:
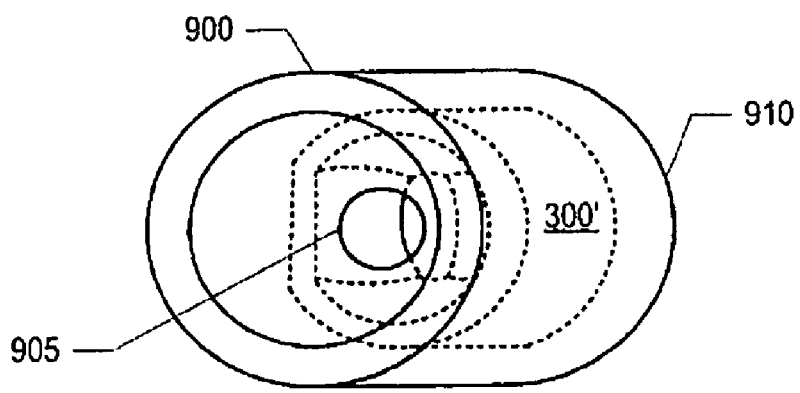

In another embodiment of the invention, the lens component can be inserted into a lens holder comprising an aperture. FIGS. 9 and 10 illustrate a lens module comprising a lens component 300' and a lens holder 900 comprising a circular aperture 905. In this embodiment, the lens holder aperture 905 is rotationally-symmetrical so that the lens component 300' can be inserted into the lens holder without having to monitor the orientation of the lens component 300' and the lens holder 900. In addition, a lens holder with a circular aperture can be easily and accurately manufactured. For example, the lens holder 900 can be machined. In alternate embodiments the lens holder 900 can have a non-rotationally-symmetrical aperture. The aperture 905 can be made as part of the lens holder, or in other embodiments of the invention, the aperture can be on a plate that fits over an end of a lens holder.

In FIGS. 9 and 10, the height of a laser beam is defined by the lens holder aperture 905 and the width of the laser beam is defined by the lens aperture 305. As illustrated in FIG. 9, the critically angled surfaces 315 and 317, which reflect light away, are visible through the lens holder aperture 905, and do not allow light to pass. In alternate embodiments, the height of the laser beam is defined by the lens aperture 305 and the width of the laser beam is defined by the lens holder aperture 905. Both the height of the laser beam and the width of the laser beam can be independently adjusted to be optimized for a desired scanner performance.

Although the preceding embodiments describe the invention in a dataform scanning environment, the combined lens module of the present invention can be used in any beam shaping application. For example, and not limited to, laser pointers, laser projectors, lasers for reading optical discs, laser guidance, etc.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. A lens module comprising:
   a focusing lens; and
   an aperture which is part of said focusing lens, wherein said aperture is formed by at least one surface positioned at an angle larger than a critical angle for total internal reflection, the at least one surface reflecting a portion of light within the focusing lens.

2. The lens module of claim 1, wherein said focusing lens comprises a surface where light enters the focusing lens and a surface where light exits the focusing lens, and wherein focusing of light occurs on at least one of said entering surface and said exiting surface.

3. The lens module of claim 2, wherein said aperture is formed on said exiting surface.

4. The lens module of claim 2, wherein one of said entering surface and said exiting surface has one of a rotationally-symmetrical shape and a non-rotationally-symmetrical shape.

5. The lens module of claim 4, wherein said rotationally-symmetrical shape is spherical.

6. The lens module of claim 4, wherein said rotationally-symmetrical shape is cylindrical.

7. The lens module of claim 1, further comprising an alignment feature.

8. The lens module of claim 7, wherein said alignment feature is a protruding portion of said outer region.

9. The lens module of claim 7, wherein said alignment feature is a recessed portion of said outer region.

10. The lens module of claim 7, further comprising a second alignment feature symmetrically positioned on said outer region.

11. The lens module of claim 1, wherein said aperture defines at least one of a horizontal width and a vertical height of a laser beam.

12. The lens module of claim 1, wherein said aperture has one of a semi-elliptical shape, an elliptical shape, a rectangular shape, a circular shape and a free shape.

13. The lens module of claim 1, further comprising a cylindrical lens holder.

14. The lens module of claim 1, further comprising a lens holder, wherein said lens holder comprises a first end and a second end, and wherein one of said first end and said second end comprises an aperture.

15. The lens module of claim 14, wherein said lens aperture defines a width of a laser beam and said lens holder aperture defines a height of a laser beam.

16. The lens module of claim 14, wherein said lens aperture defines a height of a laser beam and said lens holder aperture defines a width of a laser beam.

17. A lens module comprising:
    a focusing lens;
    an aperture which is part of said focusing lens, wherein said aperture is formed by at least one surface positioned at an angle larger than a critical angle for total internal reflection, the at least one surface reflecting a portion of light within the focusing lens; and
    a lens holder.

18. A lens module comprising:
    a focusing lens, comprising a first surface for receiving light, and wherein said first surface has one of a rotationally-symmetrical shape and a non-rotationally-symmetrical shape, and wherein said focusing lens comprises a second surface for focusing light exiting said focusing lens, the second surface reflecting a portion of light within the focusing lens; and an alignment feature.

19. The lens module of claim 18, further comprising an aperture formed by at least one surface positioned as part of said second surface at an angle larger than a critical angle for total internal reflection.

20. The lens module of claim 19, further comprising a lens holder, wherein said lens holder comprises a first end and a second end, and wherein one of said first end and said second end comprises an aperture.

21. A scan module comprising:
    a laser;
    a lens module comprising, a focusing lens, and an aperture which is part of said focusing lens, wherein said aperture is formed by at least one surface positioned at an angle larger than a critical angle for total internal reflection, the at least one surface reflecting a portion of light within the lens module; and a sensor.

22. The scan module of claim 21, wherein said scan module is part of a scanning device.

23. The scan module of claim 21, wherein said focusing lens comprises a surface where light enters the focusing lens and a surface where light exits the focusing lens, and wherein focusing of light occurs on at least one of said entering surface and said exiting surface.

24. The scan module of claim 23, wherein said aperture is formed on said exiting surface.

25. The scan module of claim 23, wherein one of said entering surface an said exiting surface has one of a rotationally-symmetrical shape and a non-rotationally-symmetrical shape.

26. The scan module of claim 21, wherein said lens module further comprises a lens holder, wherein said lens holder comprises a first end and a second end, and wherein one of said first end and said second end comprises an aperture.

27. The scan module of claim 26, wherein said lens aperture defines a width of a laser beam and said lens holder aperture defines a height of a laser beam.

28. The scan module of claim 26, wherein said lens aperture defines a height of a laser beam and said lens holder aperture defines a width of a laser beam.

29. A method of shaping a laser beam comprising:

directing light towards a lens module comprising, a focusing lens, and an aperture which is part of said focusing lens, wherein said aperture is formed by at least one surface positioned at an angle larger than a critical angle for total internal reflections, the at least one surface reflecting a portion of light within the focusing lens.

30. The method of claim 29, wherein said lens module further comprises a lens holder, wherein said lens holder comprises a first end and a second end, and wherein one of said first end and said second end comprises an aperture.

31. The lens module of claim 1, wherein the focusing lens is manufactured from a glass.

32. The lens module of claim 1, wherein the focusing lens is manufactured from a plastic.

33. The lens module of claim 32, wherein at least one of an entering surface and an exiting surface of the focusing lens has a diffractive pattern disposed thereon.

* * * * *

UNITED STATES PATENT AND TRADEMARK OFFICE
CERTIFICATE OF CORRECTION

| | |
|---|---|
| PATENT NO. | : 7,352,519 B2 |
| APPLICATION NO. | : 11/196585 |
| DATED | : April 1, 2008 |
| INVENTOR(S) | : Vinogradov et al. |

It is certified that error appears in the above-identified patent and that said Letters Patent is hereby corrected as shown below:

Column 10, Line 9, in Claim 29, delete "reflections," and insert -- reflection, --, therefor.

Signed and Sealed this

Seventeenth Day of November, 2009

David J. Kappos
*Director of the United States Patent and Trademark Office*